3,689,442
RIGID, NON-ELASTOMERIC, NON-CELLULAR HOT WATER RESISTANT 4,4' - METHYLENE-BIS(CYCLOHEXYLISOCYANATE)-POLYETHER POLYOL POLYURETHANES
Bernard Taub, Williamsville, N.Y., assignor to Allied Chemical Corporation, New York, N.Y.
No Drawing. Filed July 6, 1970, Ser. No. 52,719
Int. Cl. C08b 25/00; C08g 22/06
U.S. Cl. 260—9                                                6 Claims

ABSTRACT OF THE DISCLOSURE

This invention relates to rigid, non-elastomeric, non-cellular polyurethane compositions characterized by excellent retention of tensile strength even after exposure to hot water environments for extended periods. The compositions are prepared by the reaction of 4,4'-methylenebis(cyclohexylisocyanate) and a polyether polyol or mixture thereof having an average functionality of between about 4 and 8 and a hydroxyl number of from about 300 to 600.

BACKGROUND OF THE INVENTION

A wide variety of polymeric materials such as polyethylenes, polypropylenes, epoxides, polycarbonates, polyesters, polyurethanes and the like are available for the production of rigid, non-cellular materials for various applications. Among these, polyurethanes have been found to be particularly desirable for many applications because of their outstanding strength and abrasion resistance. However, rigid polyurethanes, in common with many other rigid polymeric materials, are susceptible to deterioration of physical properties, such as tensile strength, when exposed to hot water environments. As a result, polyurethanes have found little use in the manufacture of plastic pipe for hot water lines, plastic tops for coffee percolators, impellers or other parts for washing machines and dishwashers where exposure to hot water or steam is unavoidable.

It is an object of the present invention to provide polyurethane compositions especially suitable for the manufacture of rigid non-cellular, non-elastomeric articles for applications involving exposure to hot water or steam. It is a further object to provide rigid, non-cellular, non-elastomeric polyurethane resins which exhibit a marked resistance to deterioration of tensile strength even after exposure to hot water environments for extended periods.

SUMMARY OF THE INVENTION

The above and other objects are achieved in accordance with the present invention which comprises a rigid polyurethane resin obtained from the reaction of a polyether polyol, or mixture thereof having a functionality of between about 4 and 8 and a hydroxyl number of between about 300 and 600 with 4,4'-methylenebis(cyclohexylisocyanate) in amounts sufficient to provide a ratio of NCO/OH of between about 1.0 and 1.5. The resins can be readily cast or molded to produce a rigid non-cellular product of the desired shape which is characterized by excellent retention of physical properties even after exposure to hot water for extended periods.

The term "rigid" is employed herein to indicate the non-elastomeric nature of the polyurethane resins of the present invention, in contrast to the more common type of non-cellular polyurethanes, i.e. polyurethane elastomers. Most generally, polyurethane elastomers are characterized by elongation values in excess of 100% and when stretched will return to their original length when the stress is relieved. In contrast, the polyurethane resins of the present invention are characterized by elongation values in the range of between about 5% and 25%, and are especially suitable for applications where rigidity is desired.

DETAILED DESCRIPTION OF THE INVENTION

The polyether polyols or mixture thereof which may be employed are characterized by a functionality of between about 4 and 8, preferably between about 4 and 6, and a hydroxyl number of between about 300 and 600. A preferred class of polyether polyol is the polyalkylene ethers obtained by the condensation of an alkylene oxide, most preferably propylene oxide or a mixture of propylene oxide with a minor proportion, e.g. less than 50% by weight, of ethylene oxide, with a higher functionality polyhydric alcohol such as pentaerythritol, sorbitol, fructose, sucrose, and the like or mixtures thereof. Lower functionality polyhydric alcohols such as propylene glycol, 1,2,6-hexanetriol, glycerol, trimethylolpropane and the like may also be employed in admixture with the higher functionality alcohols in such proportions as to provide a polyether polyol mixture having the desired average functionality of between about 4 and 8 and average hydroxyl number of between about 300 and 600. A particularly preferred polyether polyol is a polyalkylene ether having an average hydroxyl number of between about 500 and 600 prepared by condensation of propylene oxide with a polyhydric alcohol or mixture thereof having an average functionality of between about 4 and 6, such as pentaerythritol or a suitable mixture of sucrose and glycerine.

The rigid polyurethanes of the present invention are conveniently prepared by simple mixing of the polyol with 4,4'-methylenebis(cyclohexylisocyanate), preferably at an elevated temperature such as between about 50 and 120° C., in the presence of a suitable reaction catalyst. The polyol and isocyanate are employed in amounts sufficient to provide a ratio of NCO/OH of bewteen about 1.0 and 1.2. Conventional catalysts which may be employed include, for example, tertiary amines, such as triethylamine, N-methyl morpholine, triethanolamine; antimony compounds, such as antimony naphthenate, antimony caprylate, antiminous chloride; tin compounds, such as dibutyltin dilaurate, tri-n-octyltin oxide, stannic chloride; mercury compounds, such as phenylmercuric benzoate, mercuric acetate, mercuric benzoate and the like. The amount of catalyst employed is not critical. Most generally the catalyst is employed in an amount of between about 0.001 and 1.0 percent by weight, based on the weight of the reaction mixture.

Shaped rigid polyurethane articles can be formed by preparing the reaction mixture directly in a suitable mold, preferably preheated to between about 50 and 120° C., or by preparing the reaction mixture in a separate vessel and then pouring into the mold. The reaction begins almost immediately on mixing of the reactants. Hence, the reaction mixture is normally prepared just prior to use and employed in the desired shaping operation within a few minutes. A curing period of between about ½ and 3 hours at between about 50 and 150° C. is recommended before the shaped article is removed from the mold. After removal from the mold, post-curing of the article, for example, at about 50 to 150° C. for about 10 to 30 hours, is recommended. In addition to simple casting or molding, other techniques such as compression molding may be employed. If desired, automatic processing techniques, such as injection molding, may be employed, using continuous mixing of metered streams of the reactions to supply a constant stream of the reaction mixture.

To further illustrate the present invention and the manner in which it may be practiced, the following specific examples are set forth. In the examples, unless otherwise indicated, all parts and percentages are by weight and all temperatures are in degrees centigrade.

EXAMPLE 1

A mixture of 160 parts of a sucrose-glycerine initiated propylene oxide having a functionality of about 5 and a hydroxyl number of about 530; 205 parts of 4,4'-methylenebis(cyclohexylisocyanate); and 0.09 part of phenylmercuric benzoate, was heated until, at about 80°, the mixture appeared clear, indicating homogeneity of the mixture. It was then poured into a preheated mold and maintained at 100° for 1 hour. The cured resin was removed from the mold and post-cured at 100° for 20 hours.

EXAMPLE 1a

A mixture was prepared as in Example 1 except that in place of 205 parts of 4,4'-methylenebis(cyclohexylisocyanate) there was substituted a stoichiometrically equivalent amount (136 parts) of toluene diisocyanate (a mixture of about 80% 2,4-isomer and about 20% 2,6-isomer); and because of the substantially higher reactivity of toluene diisocyanate, no catalyst was employed. The mixture was heated until, at about 55°, it appeared clear, indicating homogeneity of the mixture, and then molded, cured, and post-cured as in Example 1.

The rigid polyurethanes of Examples 1 and 1a were both clear and colorless. Samples of each of the rigid polyurethanes, thus prepared, were tested for tensile strength, before and after immersion for 28 days in a water bath maintained at 95° with the following results:

|  | Tensile strength (p.s.i.) | | Percent retention of tensile strength |
|---|---|---|---|
|  | Initial | After 28 days |  |
| Urethane resin of: |  |  |  |
| Example 1 | 10,400 | 8,000 | 77 |
| Example 1a | 12,400 | 7,000 | 56.4 |

In addition to the surprisingly high retention of tensile strength of the rigid polyurethane of Example 1 (77 percent) as compared with the polyurethane of Example 1a (56 percent) it was found that the latter turned a dark red under test conditions while the former, based on 4,4'-methylenebis(cyclohexylisocyanate) remained clear and colorless.

EXAMPLE 2

A mixture of 150 parts of a polyether tetrol (a polyoxypropylene) adduct of pentaerythritol, having an OH No. of about 560); 205 parts of 4,4'-methylenebis(cyclohexylisocyanate); and 0.09 part of phenylmercuric benzoate, was heated until the mixture became clear (about 80f). The mixture was then molded, cured and post-cured as in Example 1. The rigid, non-cellular polyurethane thus prepared had an elongation value of 11 percent. Tensile strength of the sample was, initially, 9460 p.s.i. and after immersion in water at 95° for 28 days, 7300 p.s.i.; a tensile strength retention of 77 percent. In addition, the resin remained clear and colorless.

Elongation and tensile strength values stated in the foregoing examples were measured in accordance with the provisions set forth in ASTM D–638–61–T test procedures of the American Society for Testing and Materials.

It will be apparent to those skilled in the art that many variations and modifications of the invention as hereinabove set forth may be made without departing from the spirit and scope of the invention. The invention is not limited to those details and applications described, except as set forth in the appended claims.

I claim:

1. A rigid, non-elastomeric, non-cellular, polyurethane composition characterized by excellent retention of tensile strength after extended exposure to hot water environments consisting essentially of the reaction product of 4,4'-methylenebis(cyclohexylisocyanate) and a polyether polyol having an average functionality of between about 4 and 8 and a hydroxyl number of between about 300 and 600, in amounts sufficient to provide a ratio of NCO/OH of between about 1.0 and 1.5.

2. A polyurethane composition according to claim 1 wherein said ratio of NCO/OH is between about 1.05 and 1.2.

3. A polyurethane composition according to claim 2 wherein said polyether polyol has a functionality of between about 4 and 6.

4. A polyurethane composition according to claim 1 wherein said polyether polyol is a polyalkylene ether having an average hydroxyl number of between about 500 and 600 prepared by condensation of a propylene oxide with a polyhydric alcohol or mixture thereof having an average functionality of between about 4 and 6.

5. A polyurethane composition according to claim 4 wherein said polyhydric alcohol is pentaerythritol.

6. A polyurethane composition according to claim 4 wherein said polyhydric alcohol is a mixture of sucrose and glycerine.

References Cited

UNITED STATES PATENTS

| 3,492,255 | 1/1970 | Cobbledick | 260—9 |
| 3,464,935 | 9/1969 | Sepkoski et al. | 260—77.5 AS |
| 3,523,106 | 8/1970 | Davison | 260—77.5 AT |
| 3,442,888 | 5/1969 | Degginger et al. | 260—77.5 AS |

WILLIAM H. SHORT, Primary Examiner

E. WOODBERRY, Assistant Examiner

U.S. Cl. X.R.

260—77.5 AS, 77.5 AP